3,417,127
NITRATION OF HYDROCARBONS WITH
HNO₃-(CF₃CO)₂O MIXTURE
Richard D. Smetana, Beacon, and Harry Chafetz, Poughkeepsie, N.Y., assignors to Texaco Inc., New York, N.Y., a corporation of Delaware
No Drawing. Filed June 9, 1967, Ser. No. 644,783
4 Claims. (Cl. 260—466)

ABSTRACT OF THE DISCLOSURE

A method of nitrating alkanes and cycloalkanes of from 2 to 50 carbons to form nitrate and nitro derivatives comprising contacting said alkanes and cycloalkanes with a mixture of nitric acid (HNO₃) and trifluoroacetic anhydride ((CF₃CO)₂O). The trifluoroacetic anhydride functions in combination with the nitric acid to accelerate the rate and extent of nitration and direct the reaction towards the formation of nitrate products and trifluoroacetate by-products. By standard hydrogenation procedures the nitrates in the resultant nitration product can be readily converted to their corresponding alkanol and cycloalkanol and the nitro products therein can be converted to their corresponding alkyl and cycloalkyl amines. The trifluoroacetate by-products can be hydrolyzed to their corresponding alcohols.

BACKGROUND OF INVENTION

Field of invention

This invention is in the field of art relating to manufacture of compounds having the general formula:

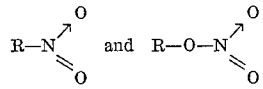

where R is a monovalent saturated aliphatic hydrocarbon radical (alkyl) or monovalent saturated cycloaliphatic hydrocarbon radical (cycloalkyl).

Description of prior art

Nitration of alkanes and cycloalkanes with nitric acid is, of course, known. Although these prior nitration procedures produced nitration products, the extent and rate of nitration and the production of nitrates vis-a-vis nitro compounds leave much to be desired. In the method of the present invention the extent and rate of nitration is increased under comparable conditions over many past low temperature liquid phase procedures, particularly in respect to the formation of the alkyl and cycloalkyl nitrate product. The increased nitrate content in the nitration products of the invention render them more suitable for conversion into alcohol via hydrogenation.

SUMMARY OF INVENTION

This invention relates to a low temperature, liquid phase method of preparing nitration products at an increased degree and rate and of increased nitrate content. More particularly, our method comprises contacting a hydrocarbon of from 2 to 50 carbons selected from the group consisting of alkane and cycloalkane with a mixture of trifluoroacetic anhydride and nitric acid of a concentration ranging from 90 to 100 wt. percent at a temperature between about −20° and 50° C. We have unexpectedly discovered that trifluoroacetic anhydride in combination with nitric acid substantially increases the rate and extent of nitration under the conditions of the reaction and directs the reaction to the formation of alkyl and cycloalkyl nitrates as well as trifluoroacetate by-products at the expense of the formation of alkyl and cycloalkyl nitro compounds.

DETAILED DESCRIPTION OF THE INVENTION

In the operation of the method of the invention a hydrocarbon of from 2 to 50 carbons selected from the group consisting of alkane and cycloalkane is contacted with between about 90 to 100 wt. percent nitric acid at a temperature of between −20° and 50° C. in the presence of trifluoroacetic anhydride ultilizing a mole ratio of trifluoroacetic anhydride to HNO₃ of between about 20:1 and 1:20, nitric acid to hydrocarbon between about 10:1 and 1:20 and trifluoroacetic anhydride to hydrocarbon between about 20:1 and 1:100.

Under preferred conditions, the reaction temperature is between about 0 and 30° C. Further, preferred mole ratios of trifluoroacetic anhydride to nitric acid of between about 4:1 and 1:4, nitric acid to hydrocarbon of between about 2:1 and 1:10 and trifluoroacetic anhydride to hydrocarbon of between about 1:2 and 1:10 are employed. Still further, the concentration of nitric acid utilized is preferably about 100 wt. percent.

Hereinbefore and hereinafter the term "wt. percent" in referring to nitric acid denotes the amount of HNO₃ in admixture with water. Thus 90 wt. percent nitric acid refers to a nitric acid combination of 90 wt. percent HNO₃ and 10 wt. percent H₂O.

Although the reaction ingredients may be introduced into the reaction vessel in any order, it is preferred to incrementally introduce the trifluoroacetic anhydride to a mixture of nitric acid and hydrocarbon reactant for better temperature control since the reaction is highly exothermic. Also, preferred conditions, the nitration mixture is rapidly stirred which affords increased reactant contact and thereby increases yields.

In addition, under preferred conditions, the reaction is conducted until no more than about 20% of the hydrocarbon is reacted since substantially higher conversions permit material formation of undesired ketones, carboxylic acids and polyfunctional compounds.

It is to be noted that reaction temperatures above about 50° C. undesirably result in the formation of a substantial amount of undesired ketonic and polyfunctional compounds and make it more difficult to avoid loss of the volatile reactants. Reaction temperatures below about −20° C. result in a substantial reduction of the rate of nitration. Further, nitric acid concentration below about 90 wt. percent results in sharply reduced nitration product yield.

The nitration products are recovered from the reaction mixture by standard means such as removing the volatile reaction ingredients and by-products such as NO₂, HNO₃, trifluoroacetic acid and trifluoroacetic anhydride via vacuum distillation, e.g., between about 0 and 40° C. under between about 10 and 760 mm. Hg pressure and subjecting the residue to fractional distillation to separate the resultant nitrohydrocarbons and hydrocarbyl nitrates from one another and from the unreacted hydrocarbon reactant and organic by-products such as ketones and polyfunctionals. Also, the formed hydrocarbyl trifluoroacetate by-products may be also isolated via fractional distillation.

If desired, the thus isolated nitration products can be sent onward to standard hydrogenation treatment, e.g., hydrogenating with hydrogen in the presence of hydrogenation catalyst, e.g., palladium-charcoal-potassium carbonate combination to thereby convert the alkyl and cycloalkyl nitrates into alkanols and cycloalkanols and the nitroalkanes and nitrocycloalkanes into their corresponding amines. The hydrocarbon trifluoroacetate can be converted to alcohol via standard hydrolysis treatment.

In the operation of the method of the invention it is theorized that the trifluoroacetic anhydride functions to dehydrate nitric acid to dinitrogen pentoxide coupled with the formation of trifluoroacetic acid by-product. The formed trifluoroacetic acid appears to catalytically increase the extent and rate of reaction and to direct the reaction to favor nitration formation whereas the dinitrogen pentoxide acts as the nitrating agent. The trifluoroacetic anhydride also appears to catalyze and direct the nitration.

Examples of the hydrocarbons contemplated herein are dodecane, cyclohexane, isooctane, methylcyclohexane and cyclopentane.

Examples of the nitration products and by-products contemplated herein are nitrododecanes, dodecyl nitrates, dodecyl trifluoroacetates, nitrocyclohexanes, cyclohexyl nitrates, cyclohexyl trifluoroacetates, isooctyl nitrates, nitroisooctanes, isooctyl trifluoroacetates, methylcyclohexyl nitrates, nitromethylcyclohexanes, methylcyclohexyl trifluoroacetates, cyclopentyl nitrates, nitrocyclopentanes and cyclopentyl trifluoroacetates.

The following example further illustrates the invention but is not to be construed as limitations thereof:

EXAMPLE I

To a 3-necked 100 ml. round bottomed flask fitted with a thermometer, condenser, drying tube, a stirrer and dropping funnel, there was successively charged 97 wt. percent nitric acid and n-dodecane. Trifluoroacetic anhydride was charged into the dropping funnel. The flask was placed in an ice water bath at 3° C. The anhydride was added slowly from the dropping funnel so that the exothermic reaction temperature never exceeded 5° C. After the addition of the anhydride was complete, normally about 45 minutes, the reaction was stirred for the reaction period of time. At the end of the reaction period the trifluoroacetic acid, trifluoroacetic anhydride, nitric acid and oxides of nitrogen were removed by vacuum distillation and the remaining flask contents were poured into 70 ml. of ice water containing 20 ml. diethyl ether and the mixture was shaken. Upon completion of agitation the resultant mixture formed two layers, an upper organic layer and a lower aqueous layer which were separated by gravity separation. The aqueous layer was extracted three times each with 20 ml. of diethyl ether. The organic layer and extracts were combined and washed with 70 ml. ice water. The washed organic layer was dried over anhydrous calcium chloride and the diethyl ether was removed by rotary evaporation at 20° C. under 100 mm. Hg pressure. The organic residue was analyzed via infrared spectrometry and gas chromatography.

Three runs representative of the invention (A, B and C) were made utilizing the foregoing method. In addition, one comparative Run (D) was made utilizing the general procedure of the invention with the exception trichloroacetic anhydride was substituted for trifluoroacetic anhydride.

The test data and results are reported below in Table I:

TABLE I

| Run | A | B | C | D |
|---|---|---|---|---|
| Reactants: | | | | |
| Cyclohexane, g | | | 77.9 | |
| Dodecane, g | 76.6 | 76.6 | | 38.3 |
| (CF$_3$CO)$_2$O, g | 23 | 23 | 23 | |
| (CCl$_3$CO)$_2$O, g | | | | 20.6 |
| HNO$_3$, g | 16 | 16 | 16 | 16 |
| HNO$_3$/(CF$_3$CO)$_2$O [1] | 2.32 | 2.32 | 2.32 | |
| HNO$_3$/(CCl$_3$CO)$_2$O [1] | | | | 3.8 |
| (CF$_3$CO)$_2$O/dodecane [1] | 0.24 | 0.24 | 0.12 | |
| (CCl$_3$CO)$_2$/dodecane [1] | | | | 0.072 |
| React. Cond.: | | | | |
| Time, minutes | 160 | 315 | 100 | 97 |
| Temp., ° C | 5 | 5 | 5 | 5 |
| Yield & Yield Rate: | | | | |
| Conversion, percent [2] | 7.2 | 5.8 | 4.1 | 0.06 |
| Selectivity: [3] | | | | |
| Cyclohexyl nitrate | | | 87 | |
| Nitrocyclohexane | | | 0 | |
| Cyclohexyl trifluoroacetate | | | 8 | |
| Dodecyl nitrate | 68 | 62 | | 100 |
| Nitrododecane | 20 | 22 | | 0 |
| Dodecyl trifluoroacetate | 5 | 10 | | 0 |
| Dodecanone | 7 | 6 | | 0 |

[1] Mole ratio

[2] $\text{Percent Conversion} = \dfrac{\text{moles hydrocarbon consumed}}{\text{moles hydrocarbon reactant charged}} \times 100$

[3] $\text{Percent Selectivity} = \dfrac{\text{moles of particular product}}{\text{moles of hydrocarbon reactant consumed}} \times 100$ As can be seen the yield in comparative Run D is significantly lower than in typical example Runs A, B and C.

We claim:

1. A method of nitrating a hydrocarbon of from 2 to 50 carbons selected from the group consisting of alkane and cycloalkane, comprising contacting said hydrocarbon in the presence of trifluoroacetic anhydride with between about 90 and 100 wt. percent nitric acid at a temperature between about −20° and 50° C. under a pressure of between about 1 and 100 atmospheres utilizing mole ratios of trifluoroacetic anhydride to HNO$_3$ of between about 20:1 and 1:20, trifluoroacetic anhydride to hydrocarbon between about 20:1 and 1:100, and nitric acid to hydrocarbon of between about 10:1 and 1:20.

2. A method in accordance with claim 1 wherein said temperature is between about 0° C. and 30° C., the mole ratio of said trifluoroacetic anhydride to HNO$_3$ between about 4:1 and 1:4, nitric acid to said hydrocarbon between about 2:1 and 1:10, said trifluoroacetic anhydride to said hydrocarbon between about 1:2 and 1:10, and said contacting is conducted under conditions of agitation.

3. A method in accordance with claim 2 wherein said hydrocarbon is dodecane.

4. A method in accordance with claim 2 wherein said hydrocarbon is cyclohexane.

References Cited

Titov et al.: Doklady Akad. Nauk SSSR, vol. 81, No. 6, pp. 1085 to 1088 (1951).

LELAND A. SEBASTIAN, *Primary Examiner.*

U.S. Cl. X.R.

260—467, 644, 688